Patented Feb. 16, 1937

2,070,991

UNITED STATES PATENT OFFICE 2,070,991

PROCESS FOR THE PRODUCTION OF ACID AMIDES

Walter J. Hund, Oakland, and Ludwig Rosenstein, San Francisco, Calif., assignors to Shell Development Company, San Francisco, Calif., a corporation of Delaware No Drawing. Application May 14, 1934, Serial No. 725,656

10 Claims. (Cl. 260—124)

This invention relates to a process for preparing acid amides and more particularly to their preparation by means of anhydrous or substantially anhydrous liquid ammonia whereby their production is greatly facilitated and the recovery of the resulting products greatly simplified. This invention is further concerned with the production of monohydric and polyhydric alcohols in the anhydrous state whereby the difficulties with water removal under present methods are obviated.

We have discovered that acid amides may advantageously be prepared from organic acids, their anhydrides and acid halides, by the use of liquid anhydrous ammonia, and furthermore, that this procedure is applicable to the derivatives, e. g. the esters, of acids higher than formic.

In view of the well-known anomaly of formic acid, this could in no way have been predicted. For it is well established, not only that formic acid differs radically in chemical behavior from its homologues, as evidenced by its strong acidity and unusual ease of oxidation, for example, but also that the formates exhibit many abnormal reactions as compared with similar compounds of higher acids, as illustrated by the liberation of hydrogen from sodium formate by heating. Moreover, formamide, itself, shows peculiarities of behavior not found in the higher amides making it unsound to predict their formation by analogous methods. Formic acid, for practical purposes, resembles the mineral acids.

The reaction on which our invention is based is in accordance with the following equation:

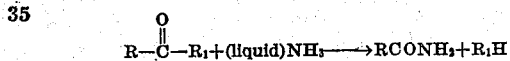

In this equation a monovalent type compound is used for illustration although more than one

group may be present as in polybasic acids as malonic, succinic and the like and their derivatives, as well as with polybasic alcohols which have been partly or completely esterified with mono- and/or polybasic acids.

In this equation R may be any organic radical. It may be of any of the following types: alkyl, as methyl, propyl, isopropyl, isobutyl, secondary or tertiary butyl or the corresponding amyl forms, and the like groups; aralkyl or aryl, as the phenyl, benzyl, cinnamyl, naphthyl and the like groups; or heterocyclic, as the pyridine, quinoline and the like forms.

$R_1$ may represent any of the following: an OH group, in which case the starting compound will be an acid as acetic or palmitic acids; a halogen, in which case the starting compound will be an acid halide as acetyl bromide or benzoyl chloride; an OR group, where R is as above defined, in this case the starting compound will be an ester, as melissic palmitate for example, or an OOCR group (when the starting compound will be an acid anhydride, as butyric anhyride and the like).

The groups represented by R may be saturated or unsaturated and may contain substituents as hydroxy (the lactic, malic and the like forms) amine groups (as the anthranilic form) and the like. Halogen substituents may also be present, in which case the resulting acid amide may contain an amine group in place of the halogen.

When R represents an OH group, that is when a carboxylic acid is used as the starting compound, the reaction may be carried out under dehydrating conditions whereby any water formed is promptly removed from the system as by reacting in the presence of suitable anhydrous salts such as copper sulfate, calcium chloride, potassium carbonate or other inactive compounds capable of forming stable hydrates under the conditions of the reaction or in the presence of other suitable water extracting agents. Or the water may be removed by evaporation with ammonia.

The essential feature of our invention, however, is the reaction of the defined compounds with ammonia in the liquefied state to form acid amides and/or anhydrous mono- or polyhydric alcohols.

As suitable starting material the chemical individuals may be used, or mixtures thereof, or they may be obtained as crude naturally occurring materials such as vegetable and animal oils, which are non-mineral oils and their equivalents such as the vegetable and animal fats, waxes, resins and the like.

For purposes of illustration only, reference will be had to the following examples which show some of the ways in which our invention may be carried out.

Example I

Coconut oil is mixed with an excess above the stoichiometric amount of liquid ammonia in an autoclave. After standing at room temperature for about 12 hours the acid amides of the mixed fatty acids of coconut oil, which have separated from the liquid as white radiating acicular crystals, are separated by filtration from the excess NH₃ (containing the glycerol formed by the reaction), and washed with liquid ammonia. The wash liquor is added to the filtrate which is distilled to recover the excess of ammonia and the glycerol is distilled from the residual dissolved acid amide and obtained in a very pure form.

Sardine oil, olive oil, castor oil, linseed oil, cottonseed oil, soya bean oil, corn germ oil, and the like as those derived by the oxidation of paraffin wax, may be similarly treated to produce their corresponding mixed acid amides.

*Example II*

Technical N-butyl acetate and an excess of liquid anhydrous ammonia were mixed in a sealed vessel. As the temperature tended to rise due to the heat of reaction, a water bath was used to keep the temperature at about 20° C. After standing for about 12 hours the excess ammonia was distilled off after which the thermometer immediately climbed to 118°. After removal of the butyl alcohol, the distillation was stopped. The residue consisted of acetamide with a small amount of ammonium acetate, the latter due to the presence of free acetic acid in the original acetic ester preparation.

The alcohol recovered may be used to re-form butyl acetate by reaction with acetic acid and thus be recycled in the process of acetamide production with very little loss.

*Example III*

Acetic anhydride and anhydrous liquid ammonia in substantially equal molecular proportions are mixed in an autoclave and the temperature maintained, by cooling, at about 20° C. After several hours the acetamide produced is separated by distillation, preferably under reduced pressure as, for example, 50 mm., from the acetic acid also formed, and the small residue of unreacted acetic anhydride. The latter may be recovered for reuse by fractionation whereby glacial acetic acid is also obtained. The acetamide so produced, on recrystallization, yields a very pure product. No acetic acid would have formed if at least two mols of ammonia had been used.

*Example IV*

Butyryl chloride and an excess of anhydrous liquid ammonia are sealed together in a glass tube, and, after thorough mixing, kept at room temperature, by means of a water bath, for several hours. The excess ammonia is then distilled off and the ammonium chloride formed is removed by washing the residue with cold water. By recrystallization of the product from alcohol or ether, pure butyramide, m. p. 115° C., is obtained in substantially quantitative yield based on the weight of butyryl chloride used.

*Example V*

Stearic acid and a substantial excess of liquid anhydrous ammonia above the stoichiometric requirement are heated together in an autoclave. The reagents are kept thoroughly mixed and maintained at a temperature of about 70° C. for about 24 hours. The excess ammonia is then removed by distillation followed by removal of free water and the residue further heated to dehydrate the substantially water-free ammonium stearate formed.

The crude stearic amide so obtained may then be purified by recrystallization from suitable solvents or by distillation in vacuo.

In all cases these reactions are carried out under pressures greater than atmospheric in order to maintain the ammonia in the liquid state and to accelerate the reaction rate. They may be hastened by the use of higher temperatures. With normally solid reactants we prefer to operate at or about their melting points. We prefer, however, to avoid temperatures at which excessive pressures are produced as expensive equipment is thereby required. Moreover, the use of very high temperatures, 250° C. and above, for example, leads to the formation of undesirable by-products such as nitriles. The heat generated may be utilized to evaporate the organic hydroxy compounds, water, etc., formed when the pressure is released or external heating may be resorted to.

The acid amide may be withdrawn from the reaction vessel continuously in a liquid condition by means of an expansion valve while part or all of the alcohol or water and the like end-products may be evaporated after its passage through the valve.

Suitable catalysts may also be used to accelerate the reaction.

The separation of the acid amide from the excess ammonia and glycerine or other liquid reaction products may be facilitated by chilling the mixture before filtration. The acid amides may be purified by crystallization and/or distillation under reduced pressure.

The quantity of liquid anhydrous ammonia used per mol. of acyl compound depends upon the operating conditions and on the character of the acyl compound. For example, if halogen substituted compounds are employed sufficient excess ammonia must be provided to allow for that which may be consumed in replacement of the halogen by an amino group, if good yields of acid amide are to be obtained. A higher reaction velocity, and consequently a greater production capacity for an autoclave of a given size is obtainable by keeping the ammonia in considerable excess.

It is thus seen that our invention provides a commercially available method for preparing, with ease and economy, all types of acid amides and at the same time recovering the valuable by-products which result, in a usable form, without the necessity for concentration or usual purification.

By our invention, the following advantages are attained: Intimate contact of reagents is secured, recourse to diluent solvents which must later be removed and, for economy of operation, purified and recovered, is avoided, and elaborate apparatus, such as is required for the use of ammonia gas, is eliminated. Furthermore, a much more accurate control of the amount of ammonia added is possible by the use of liquid ammonia than can be obtained when the gaseous form is employed. The time required for complete reaction is also much reduced as compared with ammonia gas results, while the yield is considerably enhanced over that obtainable with gaseous ammonia.

The application of our process in soap manufacture illustrates some of its special advantages. Thus the modification illustrated in Example I may be adapted to the production of wax stock fatty acids by hydrolysis of the acid amides produced. By this process the ammonia is regenerated for reuse and the fatty acid stock obtained in a pure form. The glycerol, moreover, is recovered without the necessity for the expensive concentration of dilute solutions which is a feature of previous processes.

The acid amides of the lower aliphatic acids are recognized as valuable industrial products, acetamide, for example, possesses important solvent properties. The higher acid amides have not hitherto been made commercially available because of the difficulties and expense involved in their preparation. By our process, however, rare or hitherto unknown acid amides may be prepared which may serve many useful purposes. They may be used as plasticizers, fillers, fixatives, etc. in the resin, rubber, varnish and allied arts. They may find use as paper sizers, as lubricators in greases and as stock material for the manufacture of further organic compounds. The acid amide of oleic acid obtained by separating the mixed amides produced in accordance with Example I is a talc-like material well adapted to use as a paper size. The acid amide of ricinoleic acid prepared by a similar procedure from castor oil has salve-like properties which make it useful as a plasticizer or lubricator.

As has been indicated, the homologues, analogues and substitution products of the following compounds may be successfully treated by our process: Acetic acid, propionic acid, isobutyric acid, n-butyric, isovaleric, hydrocinnamic, palmitic, melissic, dihydroxy stearic, hydroxy stearic, linolenic, linoleic, stearic, phenylacetic, oxalic, toluic, ethylmalonic, benzylmalonic, benzoic, malonic, naphthoic, succinic, phthalic, acrylic, propiolic, isocrotonic, oleic, myristic, margaric, montanic, elaidic, erucic, maleic, cinnamic, lactic, hydroxy butyric, lauric, cerotic, glycollic, citramalic, salicyclic, methyl salicylic, phenoxyacetic, pyruvic acids, their anhydrides, their methyl, ethyl, isopropyl, propyl, allyl, isobutyl, secondary butyl, tertiary butyl, the amyl, dodecyl, oleyl, montanyl, phenyl, benzyl, glycol, glyceryl, polyglycol esters, their acid halides, as the chlorides and bromides, halogenated esters, amino acids, amino esters of above.

By the expression "liquid ammonia" is meant the liquid ammonia of commerce which is substantially 100% $NH_3$ or anhydrous, but may contain traces of moisture and other impurities.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories which we have advanced as to the reasons for the advantageous results attained.

We claim as our invention:

1. A process for preparing acid amides and other valuable products which comprises reacting an ester of an aliphatic monobasic carboxylic acid and of a polyhydric alcohol containing at least two carbon atoms in the acid radical with a sufficient amount of liquid anhydrous ammonia under superatmospheric pressure to form an acid amide, and subsequently recovering a product of said reaction.

2. A process for preparing an acid amide and other valuable products which comprises reacting a glyceride with a sufficient amount of liquid anhydrous ammonia at superatmospheric pressure to form an acid amide, and subsequently recovering a product of said reaction.

3. In a process for preparing valuable products, the step of reacting a glyceride with a sufficient amount of liquid anhydrous ammonia at superatmospheric pressure until at least a portion of the combined glycerol has been liberated.

4. A process for preparing valuable products which comprises reacting a non-mineral oil in the liquid state with a sufficient amount of liquid anhydrous ammonia at superatmospheric pressure to form the mixed acid amides thereof, and subsequently recovering substantially anhydrous alcohols.

5. A composition of matter essentially consisting of mixed primary acid amides of sardine oil.

6. A process for preparing acid amides and other valuable products which comprises reacting an ester of a monobasic aliphatic carboxylic acid containing at least two carbon atoms in the acid radical and of a polyhydric alcohol containing not more than three carbinol groups with a sufficient amount of liquid anhydrous ammonia under a superatmospheric pressure to form an acid amide, and subsequently recovering a product of said reaction.

7. A composition of matter essentialy consisting of mixed primary acid amides of a fish oil.

8. A process for preparing acid amides and other valuable products which comprises reacting an ester of an aliphatic carboxylic acid containing at least two carbon atoms in the acid radical and of a polyhydric alcohol with a sufficient amount of liquid anhydrous ammonia under superatmospheric pressure to form an acid amide.

9. A process for preparing valuable products which comprises reacting a fat in the liquid state with a sufficient amount of liquid anhydrous ammonia at superatmospheric pressure to form an acid amide thereof, and subsequently recovering a substantially anhydrous alcohol.

10. A process of preparing valuable products which comprises reacting a non-mineral wax in the liquid state with a sufficient amount of liquid anhydrous ammonia at superatmospheric pressure to form an acid amide thereof, and subsequently recovering a substantially anhydrous alcohol.

WALTER J. HUND.
LUDWIG ROSENSTEIN.